United States Patent [19]

Naoi et al.

[11] Patent Number: 5,459,793
[45] Date of Patent: Oct. 17, 1995

[54] MOTION ANALYSIS SYSTEM

[75] Inventors: Satoshi Naoi, Yokohama; Tohru Ozaki, Kawasaki, both of Japan

[73] Assignee: Fujitsu Limited, Kawasaki, Japan

[21] Appl. No.: 939,837

[22] Filed: Sep. 2, 1992

Related U.S. Application Data

[63] Continuation of Ser. No. 645,509, Jan. 24, 1991, abandoned.

[30] Foreign Application Priority Data

Jan. 24, 1990 [JP] Japan ................................. 2-14078

[51] Int. Cl.$^6$ .................................................. G06K 9/00
[52] U.S. Cl. ...................... 382/165; 348/157; 348/155; 348/172; 364/551.01; 364/413.01
[58] Field of Search .................. 382/17, 18, 1; 358/105, 107, 108, 228, 213.19; 364/551.01, 413.01, 410; 348/157, 363, 365, 154, 155, 169, 171, 172

[56] References Cited

U.S. PATENT DOCUMENTS

| | | | |
|---|---|---|---|
| 3,840,699 | 10/1974 | Bowerman | 358/125 |
| 4,060,830 | 11/1977 | Woolfson | 358/126 |
| 4,975,973 | 12/1990 | Kasano et al. | 382/18 |
| 4,991,223 | 2/1991 | Bradley | 382/17 |
| 5,072,294 | 12/1991 | Engle | 358/105 |
| 5,083,209 | 1/1992 | Inoue et al. | 358/228 |

FOREIGN PATENT DOCUMENTS

| | | | |
|---|---|---|---|
| 58-2199885 | 12/1983 | Japan | H04N 7/18 |
| 60-253887 | 12/1985 | Japan | H04N 7/18 |
| 63-140381 | 6/1988 | Japan | G06F 15/70 |
| 63-314988 | 12/1988 | Japan | H04N 9/74 |
| 2071773 | 12/1990 | Japan | H04N 7/18 |
| WO9015509 | 6/1990 | WIPO | H04N 7/18 |

OTHER PUBLICATIONS

G. Ferrigno & M. Gussoni, "Procedure to automatically classify markers . . . ", Medical & Biological Engineering & Computing, May 1988.

Primary Examiner—Leo H. Boudreau
Assistant Examiner—Phuoc Tran
Attorney, Agent, or Firm—Staas & Halsey

[57] ABSTRACT

A motion analysis system utilizing an image processing technique includes a color marker attached to an object which is to be analyzed. Each color marker has a high directivity reflective member on a surface thereof, and the reflection member reflects light having a particular wavelength. A light source generates light for irradiation onto the color marker. A color TV camera aligned in roughly the same direction as that of the light source receives reflected light from the color marker and outputs a color image. A color extraction unit connected to the TV camera, extracts only a particular color from the color image produced by the TV camera. An area calculation unit connected to the color extraction unit, calculates the area of the particular color extracted by the color extraction unit. A diaphragm adjustment unit connected between the TV camera and the area calculation unit adjusts the diaphragm of the TV camera so as to make the area calculated by the area calculation unit equivalent to the actual color area of the color marker and a center of gravity calculation unit connected to the area calculation unit, calculates a position of the center of gravity of the particular color based on the area calculated by the area calculation unit.

19 Claims, 14 Drawing Sheets

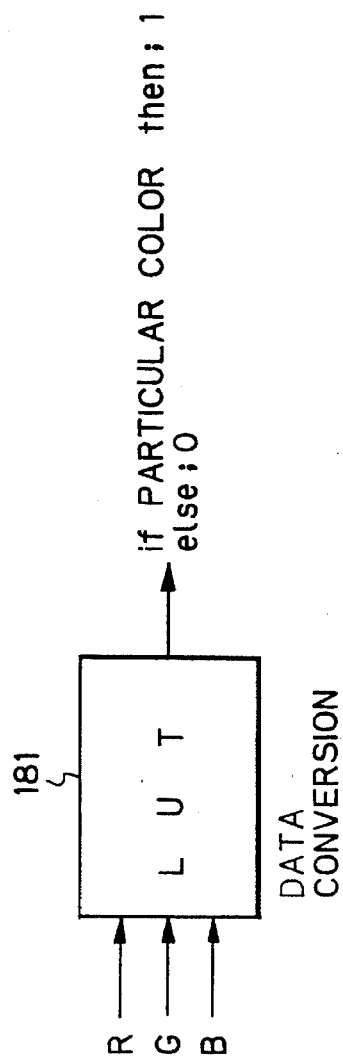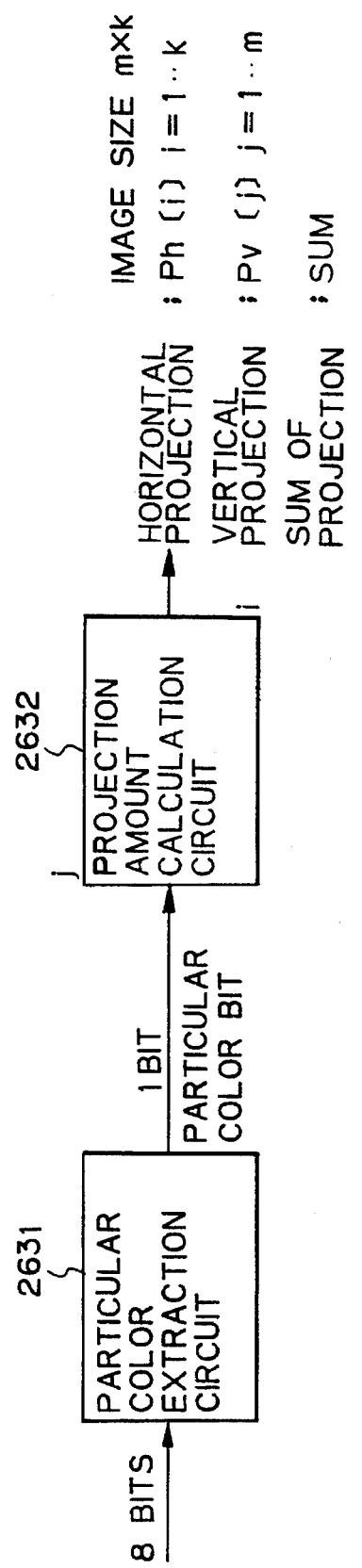

LOCUS OF GOLF-CLUB HEAD

VERTICAL FLUCTUATION VALUE
(FROM "ADDRESS" UNTIL "IMPACT")

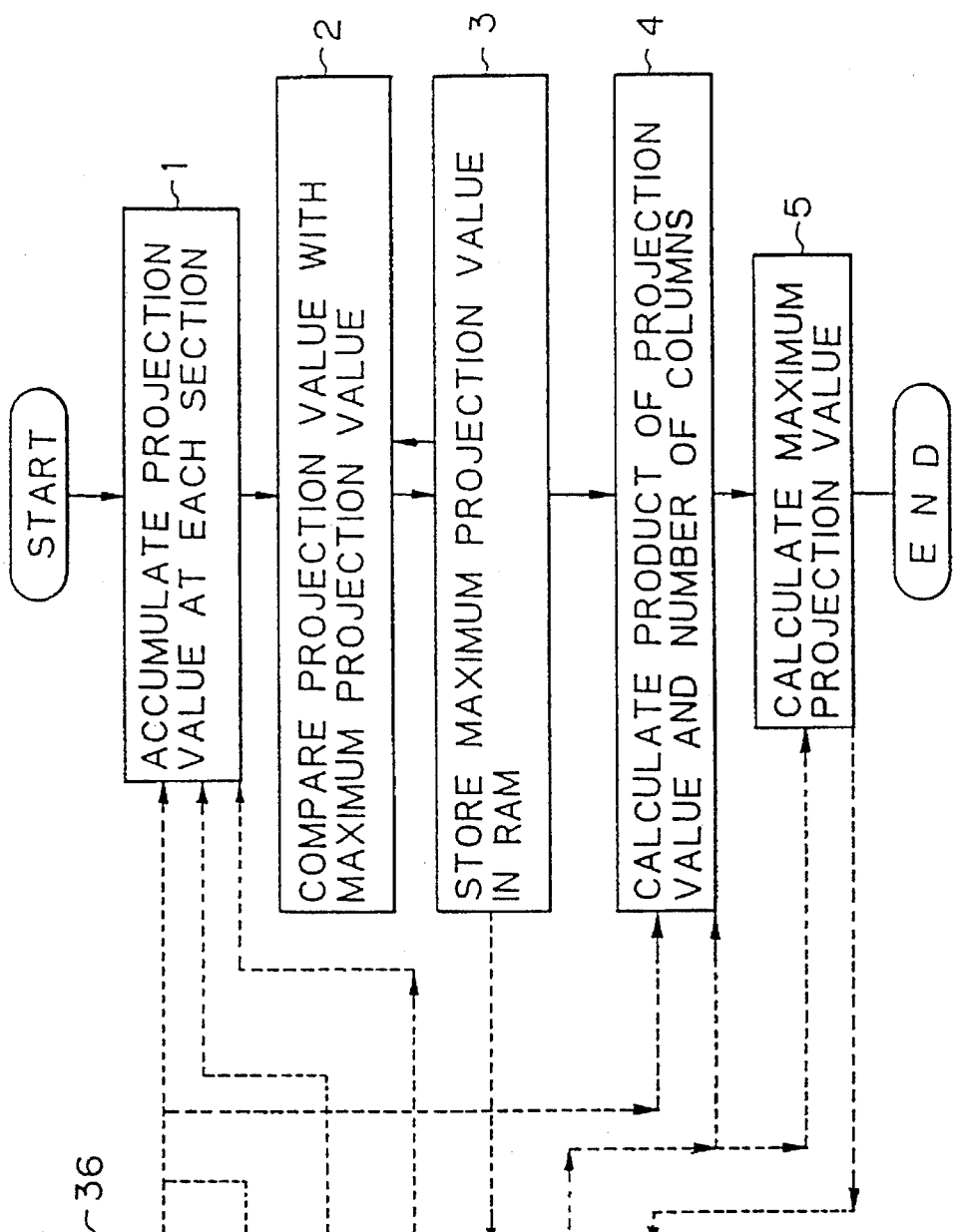

MOTION ANALYSIS SYSTEM

This is a continuation of application Ser. No. 07/645,509, filed Jan. 24, 1991, now abandoned.

BACKGROUND OF THE INVENTION

1. Field of the Invention

The present invention relates to an image processing system, more particularly, it relates to a motion analysis system utilizing an image processing technique. The present invention can be advantageously utilized for improving body action in various sports.

2. Description of the Related Art

Motion analysis systems utilizing an image processing technique are widely used in various fields, particularly, in the field of various sports, for example, golf and baseball.

In general, a color marker is attached to an object to be analyzed, for example, an arm, a knee, or a waist of a human body. The color marker is detected by a color TV camera, and displayed on a cathode ray tube (CRT) after various image processing steps. Accordingly, a user, for example, a golfer, can easily improve his motion by reference to a locus of the color marker displayed on the CRT.

SUMMARY OF THE INVENTION

The object of the present invention is to provide a motion analysis system having an improved color marker and having a simplified and low cost structure, and enabling easy extraction of the particular color of a color marker and precise motion analysis of an object to be analyzed.

In accordance with the present invention, there is provided a motion analysis system including: at least one color marker attached to an object to be analyzed, each color marker having a high directivity reflective member on a surface thereof, and the high directivity reflective member reflecting a light having a particular wavelength; a light source for generating light to be irradiated onto the color marker; a color TV camera aligned in substantially the same direction as the light source for receiving a reflected light from the color marker and outputting a color image; a color extraction unit operatively connected to the TV camera, for extracting only a particular color from the color image produced by the TV camera; an area calculation unit operatively connected to the color extraction unit, for calculating the area of the particular color extracted by the color extraction unit; a diaphragm adjustment unit operatively connected between the TV camera and the area calculation unit, for adjusting the diaphragm of the TV camera so as to make the area calculated by the area calculation unit coincide with the actual color area of the color marker; and a center of gravity calculation unit operatively connected to the area calculation unit, for calculating a position of the center of gravity of the particular color based on the area calculated by the area calculation unit.

In an embodiment of the present invention, the color marker is formed as a spherical body or polygonal body having the high directivity reflective member attached on the surface thereof.

In this embodiment, a color extraction unit comprises a look-up table for data conversion from R, G, B signals to particular color bits, R, G, B signals being input from the TV camera through an analog-to-digital converter. The look-up table outputs a bit "1" when a particular color indicating the color of the color marker is detected, and outputs a bit "0" when another color is detected. The area calculation unit comprises a particular color extraction circuit and a projection amount calculation circuit for calculating the area of the particular color by the projection amount for the horizontal and vertical directions. The center of gravity calculation unit comprises a digital signal processor (DSP) associated with a host computer, the DSP having a section decision unit, a section projection calculation unit, a section selection unit, and a section center of gravity calculation unit. The DSP further comprises an external random access memory (RAM), the RAM storing a horizontal projection value, a vertical projection value, a projection valid section, a section width, a maximum section projection, and a position of the center of gravity.

BRIEF DESCRIPTION OF THE DRAWINGS

FIG. 6 is one example of the color extraction unit shown in FIG. 5;

FIG. 7 is one example of the projection calculation circuit shown in FIG. 5;

FIG. 11 is a view for explaining contents of an external random access memory connected to a digital signal processor according to the present invention;

FIG. 12 is a flowchart for calculating the center of gravity in the digital signal processor shown in FIG. 10;

DESCRIPTION OF THE PREFERRED EMBODIMENTS

Figure 1:
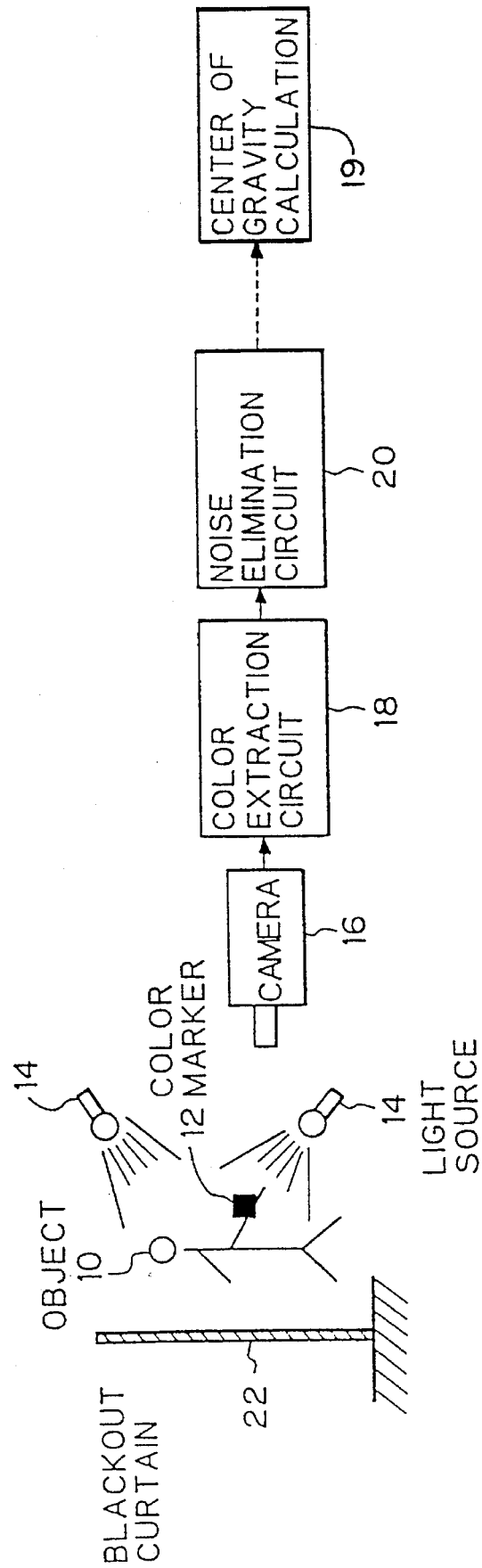
FIG. 1 is a schematic block diagram of a conventional motion analysis system.

FIG. 1 is a schematic block diagram of a conventional motion analysis system. In FIG. 1, reference number 10 denotes an object to be analyzed, 12 a color marker attached to the object, 14 a plurality of light sources, 16 a color TV camera, 18 a color extraction circuit, 20 a noise elimination circuit, and 22 a blackout curtain.

In general, the color marker 12 is made of a colored paper. The color of the colored paper is selected so as to be able to distinguish it from the color of the blackout curtain 22. The color marker 12 is attached to an arm, a knee and the like for which motion analysis is required. The movement of the color marker 12 is detected by the color TV camera 16. The color extraction circuit 18 inputs a color image detected by the TV camera 16 and extracts a particular color image reflected from the color marker 12. The noise elimination circuit 20 is provided for eliminating noise components in the color image. The particular color extracted from the color extraction circuit 18 is input to a center of gravity calculation unit for calculating the center of the gravity of the particular color.

Figure 2:
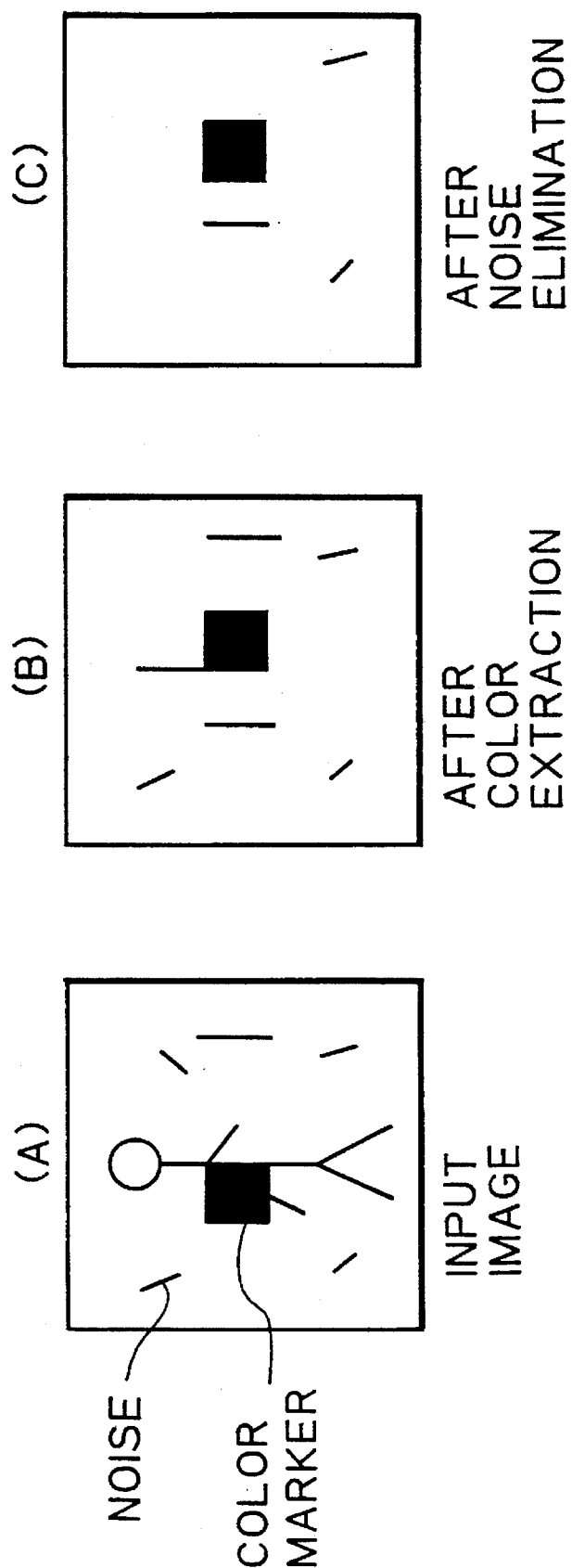
FIG. 2 is a view for explaining noise dispersion in the conventional art shown in FIG. 1.

FIG. 2 is a view for explaining noise dispersion in the conventional art shown in FIG. 1. (A) denotes the color marker and the noise detected by the TV camera 16, (B) denotes the noise dispersion after color extraction operation by the color extraction circuit 18, and (C) denotes the noise dispersion after noise elimination operation by the noise elimination circuit 20.

As is obvious from the drawings, even if the noise elimination operation is performed by the noise elimination circuit 20, much noise remains in the color image as shown by (C). This noise mainly occurs in an outline of the color marker 12. That is, the noise appears in a vicinity of a boundary between the color marker 12 and the blackout curtain 22.

Accordingly, for the noise elimination circuit 20, although the following means are not shown in the drawings, it is necessary to provide high performance noise elimination means, for example, a mask processor for selecting a particular area in the color image, a logic filter for eliminating an isolated point in the color image, and a labelling processor for selecting only a large area in the color image. However, these means for noise elimination are very expensive so that they are not suitable for general use. Further, when calculating the center of gravity of the color image after noise elimination, it is difficult to precisely calculate the center of gravity because much noise is contained in the color image.

Briefly, there are some problems in the conventional art as follows. First, it is necessary to select the color of the blackout curtain 22 so as to be able to distinguish it from the color of the color marker 12. Second, it is necessary to provide a plurality of light sources to ensure the brightness of the color marker 12 so that the structure of the system becomes complex. Third, it is necessary to provide a high grade and very expensive noise elimination circuit, for example, a logic filter or a labelling circuit to eliminate the noise which approximates the color of the color marker and generated on the edge of the color marker so that the cost of the system becomes very expensive.

Figure 3:
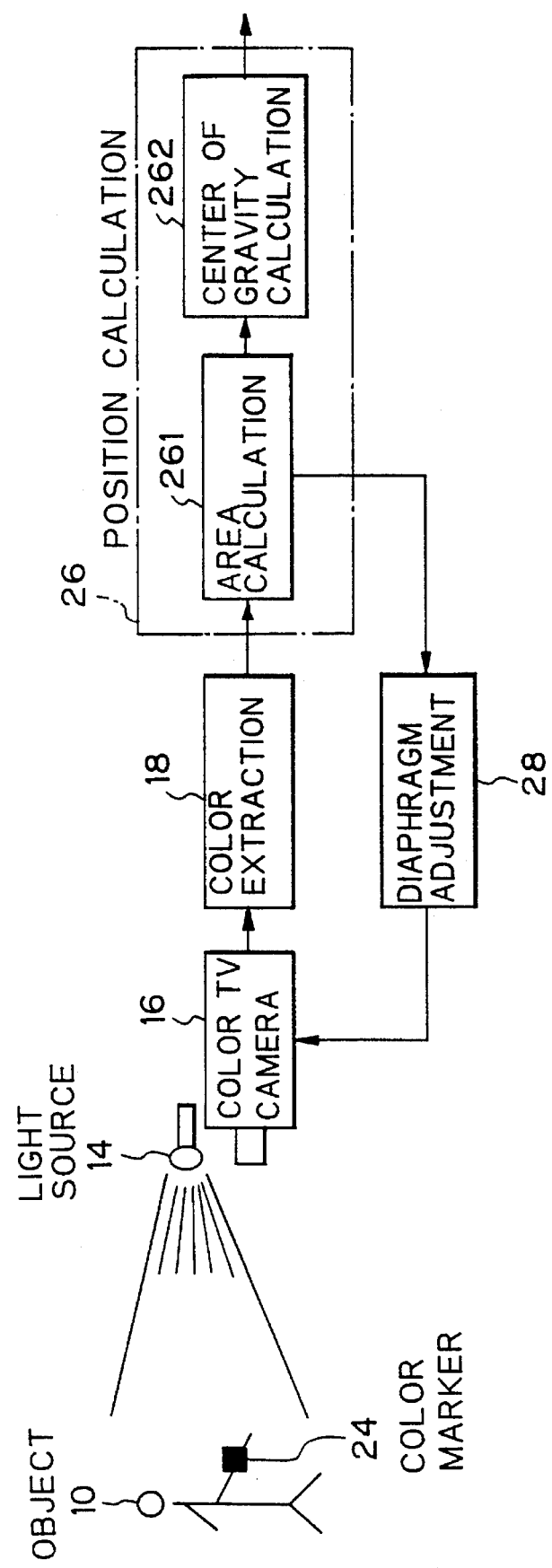
FIG. 3 is a basic block diagram of a motion analysis system according to the present invention.

FIG. 3 is a basic block diagram of a motion analysis system according to the present invention. As is obvious from the drawings, the blackout curtain and the noise elimination circuit in FIG. 1 are not necessary in the present invention. Further, only one light source is provided for irradiating the color marker 24, and the direction of the irradiation light from the light source 14 coincides with the direction of the TV camera.

In FIG. 3, reference number 24 denotes a color marker according to the present invention, 26 denotes a position calculation unit, and 28 denotes a diaphragm adjustment unit. Further, in the position calculation unit, reference number 261 denotes an area calculation unit, and 262 denotes a center of gravity calculation units. The color marker 24 according to the present invention is formed by a spherical body or polygonal body and a high directivity light reflection member is attached to the surface thereof for strongly reflecting only light having a special wavelength. Two examples of the color markers are shown in detail in FIGS. 17 and 18.

The area calculation unit 261 calculates the area of the particular color image extracted by the color extraction unit 18. The diaphragm adjustment unit 28 adjusts the diaphragm of the color TV camera 16 so as to make the area calculated by the area calculation unit 261 coincide with the surface area of the color marker 24. According to the present invention, it is possible to perfectly separate the color of the color marker 24 from the background color so that it is not necessary to provide the conventional blackout curtain.

The center of gravity calculation unit 262 calculates the position of the center of gravity of the color image based on the area calculated by the area calculation unit 261. The area calculation unit 261 and the center of gravity calculation unit 262 are explained in detail in FIG. 5.

Figure 4:
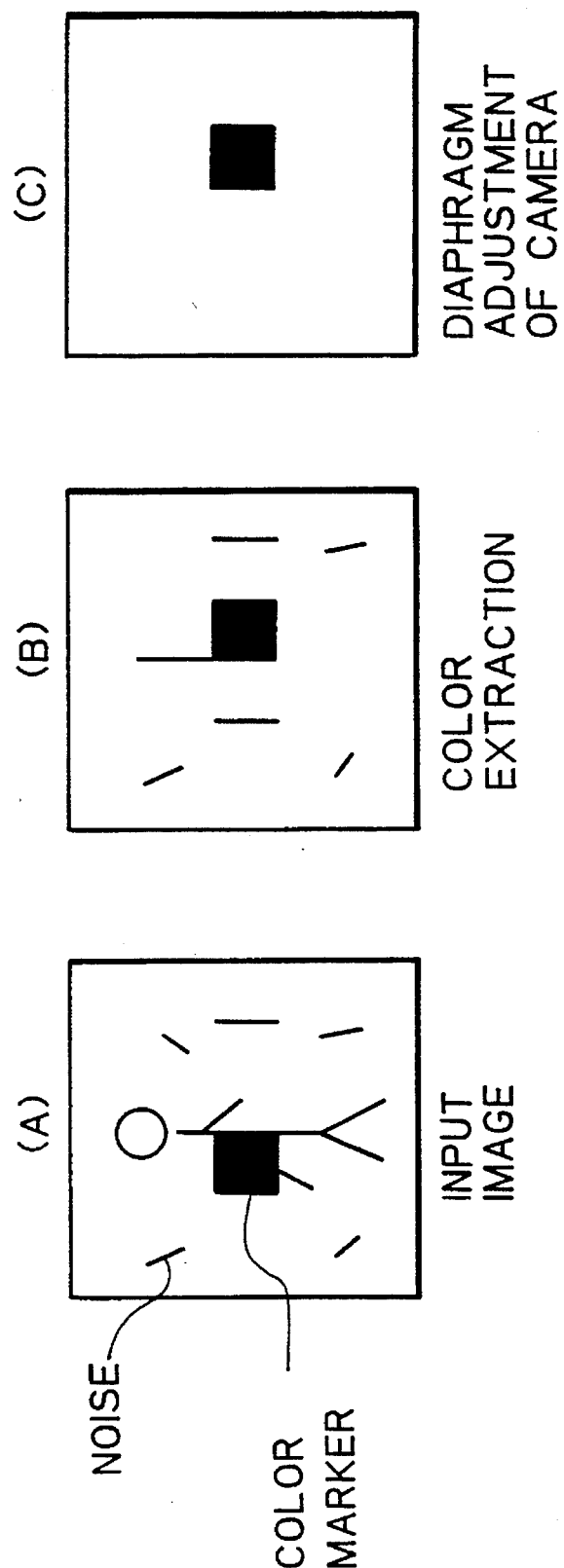
FIG. 4 is a view for explaining noise dispersion according to the present invention.

FIG. 4 is a view for explaining noise dispersion according to the present invention. (A) denotes the color marker and the noise dispersion detected by the color TV camera 16, (B) denotes the noise dispersion after color extraction operation by the color extraction circuit 18 and (C) denotes the noise dispersion after the diaphragm adjustment of the color TV camera 16. As is obvious from the drawings, the noise in the color image is perfectly eliminated after the diaphragm adjusting operation by the diaphragm adjustment unit 28 as shown by (C).

Figure 5:
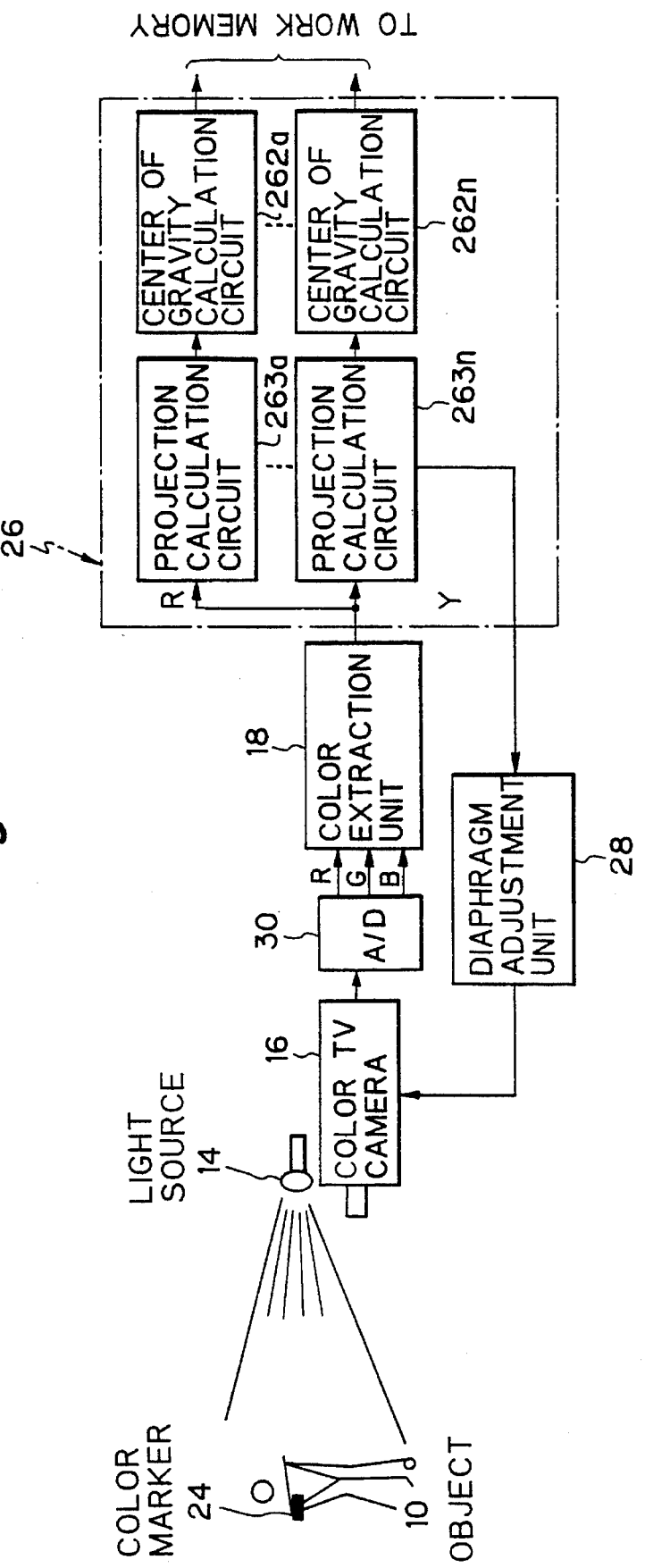
FIG. 5 is a schematic block diagram of a motion analysis system according to an embodiment of the present invention.

FIG. 5 is a schematic block diagram of a motion analysis system according to an embodiment of the present invention, FIG. 6 is one example of the color extraction unit shown in FIG. 5, and FIG. 7 is one example of the projection calculation unit shown in FIG. 5.

In FIG. 5, the position calculation unit 26 comprises a plurality of projection calculation circuits 263a to 263n and a plurality of center of gravity calculation circuits 262a to 262n. Each of the projection calculation circuits and corresponding center of gravity calculation circuits are provided on every color marker 24.

The motion analysis system of this embodiment is preferably used for measuring each position of a head of a golf-club and each position of the body of a golfer, and analyzing the movement of the golf-club and the body. In FIG. 5, the color marker 24 is attached to a shoulder of the golfer. The color markers 24 can be attached to the head, waist, hand, knee, and the like of the golfer. In this case, each color marker 24 has a different color. The surface of the color marker 24 is made of a high directivity light reflection plate which reflects only light having a special wavelength. This member is available, for example, as a "reflection marker" attached to a rear portion of a bicycle.

Figure 17:
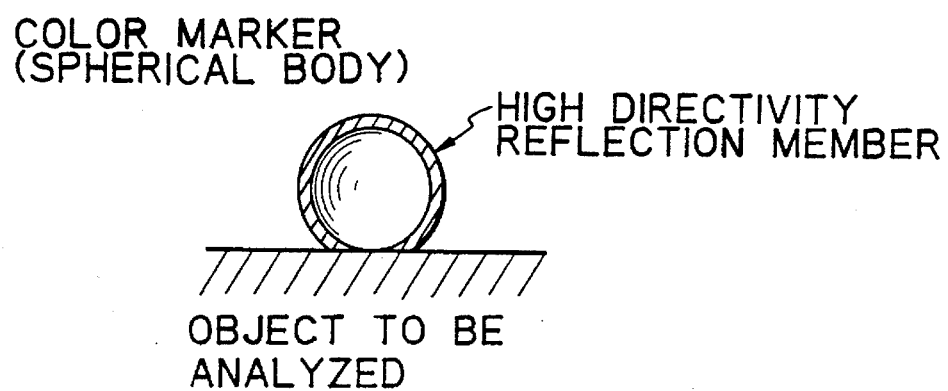
FIG. 17 is a view for explaining a color marker having a spherical body according to one example of the present invention.
Figure 18:
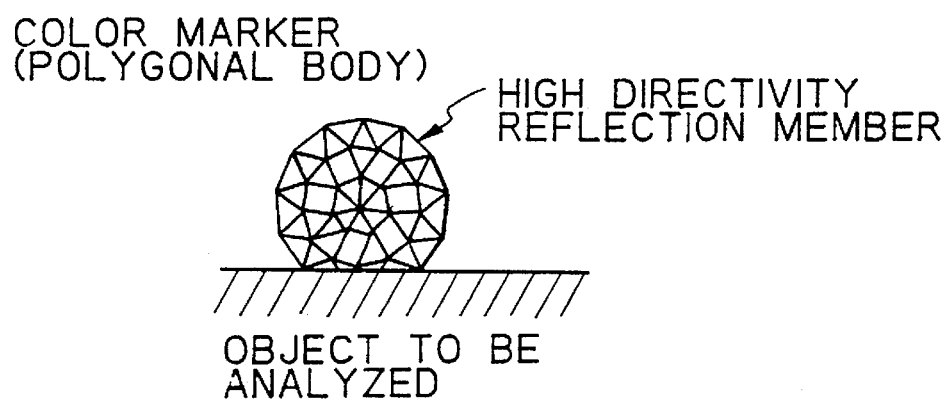
FIG. 18 is a view for explaining a color marker having a polygonal body according to another example of the present invention.

Since the color marker 24 is formed as a spherical body or polygonal body as shown in FIGS. 17 and 18, the color marker 24 has curved surfaces each having a full reflection surface so that it is possible to ensure sufficient reflected light from the color marker 24. This curved surface is advantageous compared with a flat surface, because if the color marker is made with a flat plate having a full reflection surface, the light source 14 itself is also detected by the color TV camera so that it is impossible to detect only a color marker.

As shown in FIG. 5, the direction of the light source 14 coincides with the direction of the color TV camera 16. That is, the light is arranged in the same direction as that of the TV camera 16. Conventionally, as shown in FIG. 1, at least four light sources each of 1 KW are necessary for illuminating the color marker attached to the head of the golf-club because the range of movement of the head of the golf-club is very large. In the present invention, only one light source of 500 W to 1 KW is sufficient to ensure adequate brightness because the reflected light from the color marker of the present invention has high directivity so that it is possible to clearly detect only the color marker by the TV camera.

The color TV camera 16 of the present invention also has a shutter mechanism. It is therefore possible to raise the shutter speed to 1/1000 second since the reflected light from the color marker 24 has high directivity.

An analog-to-digital converter (A/D) 30 is provided for converting the color image of the TV camera to R (Red), G (Green), and B (Blue) signals. These signals are input to the color extraction unit 18.

As shown in FIG. 6, the color extraction unit 18 comprises a look-up table for data conversion. When the R, G, B signals are input to the look-up table 181, the look-up table 181 outputs a bit "1" when a particular color indicating the color of the color marker is detected, and outputs the bit "0" when another color is detected. The output of the color extraction unit 18 is constituted by, for example, eight bits of "1" or "0".

As shown in FIG. 7, the projection calculation circuit 263 comprises a particular color extraction circuit 2631 and a projection amount calculation circuit 2632.

The particular color extraction circuit 2631 has an AND gate (not shown) provided for extracting the particular color. That is, one input terminal of the AND gate receives the output of the color extraction unit 18 and the other input terminal of the AND gate receives the particular color to be extracted. Accordingly, when the output of the color extraction circuit 18 coincides with the particular color, the particular color bit "1" is output from the AND gate. For example, when the color marker is "red", i.e., the particular color is "red" and red is expressed by eight bits of "00000010", these eight bits of the particular color are input to the other input terminal of the AND gate. Accordingly, when the output (eight bits) of the color extraction unit 18 coincides with the eight bits of the particular color, the particular color extraction circuit 2631 outputs the particular color bit "1" to the projection amount calculation circuit 2632.

The projection amount calculation circuit 2632 calculates the number of the particular color bits "1". The resultant data of the calculation is given as the projection amount for horizontal projection and vertical projection. The horizontal projection amount Ph is given by the number of the particular color bit "1" in the column direction, and vertical projection amount Pv in the row direction. Accordingly, the sum SUM of the projection amount of the particular color is given by total number of the particular color bit "1" in one image size (m×k). The sum of the projection amount of the particular color is fedback to a diaphragm adjustment unit 28 for adjusting the diaphragm of the TV camera.

When the size of an image is given by "m" (column)×"k" (row), the following formulae are obtained for the horizontal projection and the vertical projection. In this case, "horizontal projection" denotes data histogram for X-axis direction, and "vertical projection" denotes data histogram for Y-axis direction.

Where M (i, j) denotes an image data of column "i" and row "j".

The horizontal projection Ph (i) is given as follows.

$$Ph(i) = \sum_{j=1}^{k} M(i,j)$$

The vertical projection Ph (j) is given as follows.

$$Pv(j) = \sum_{i=1}^{m} M(i,j)$$

The sum of the projection SUM is given as follows.

$$SUM = \sum_{i=1}^{m} \sum_{j=1}^{k} M(i,j) \quad (1)$$

The horizontal projection amount, the vertical projection amount, and the sum of the projection amount are input to the corresponding center of gravity calculation circuit 262a to 262n for calculating the coordinate of the center of gravity of the color marker. The X-coordinate and Y-coordinate of the center of gravity are given by the following formulae. As is obvious from the following formulae, the center of gravity denotes the highest point of the histogram of the color image.

$$Xcenter = \left( \sum_{j=1}^{k} (Pv(j)*j) \right)/SUM \quad (2)$$

$$Ycenter = \left( \sum_{i=1}^{m} (Ph(i)*i) \right)/SUM$$

The coordinates of the center of gravity of the color marker 24 are output to a work memory (not shown) and are temporarily stored therein. The contents of the work memory are then transferred to a frame memory (not shown) to display the locus of the motion on the CRT.

The diaphragm adjustment unit 28 is used for automatically adjusting the diaphragm of the color TV camera 16. That is, the diaphragm adjustment unit 28 receives the sum of the projection amount from each of projection calculation circuits 263a to 263n, and when the actual area AREA of the color marker 24 is larger than the sum SUM of the projection amount, the diaphragm of the TV camera 16 is opened. When the actual area AREA of the color marker 24 is smaller than the sum SUM of the projection amount, the diaphragm of the TV camera 16 is closed. An upper threshold level THmax and lower threshold level THmin are defined in relation to the difference between the AREA and the SUM, and the diaphragm adjustment is performed so as to satisfy the range of these threshold levels THmax and THmin.

Figure 8:
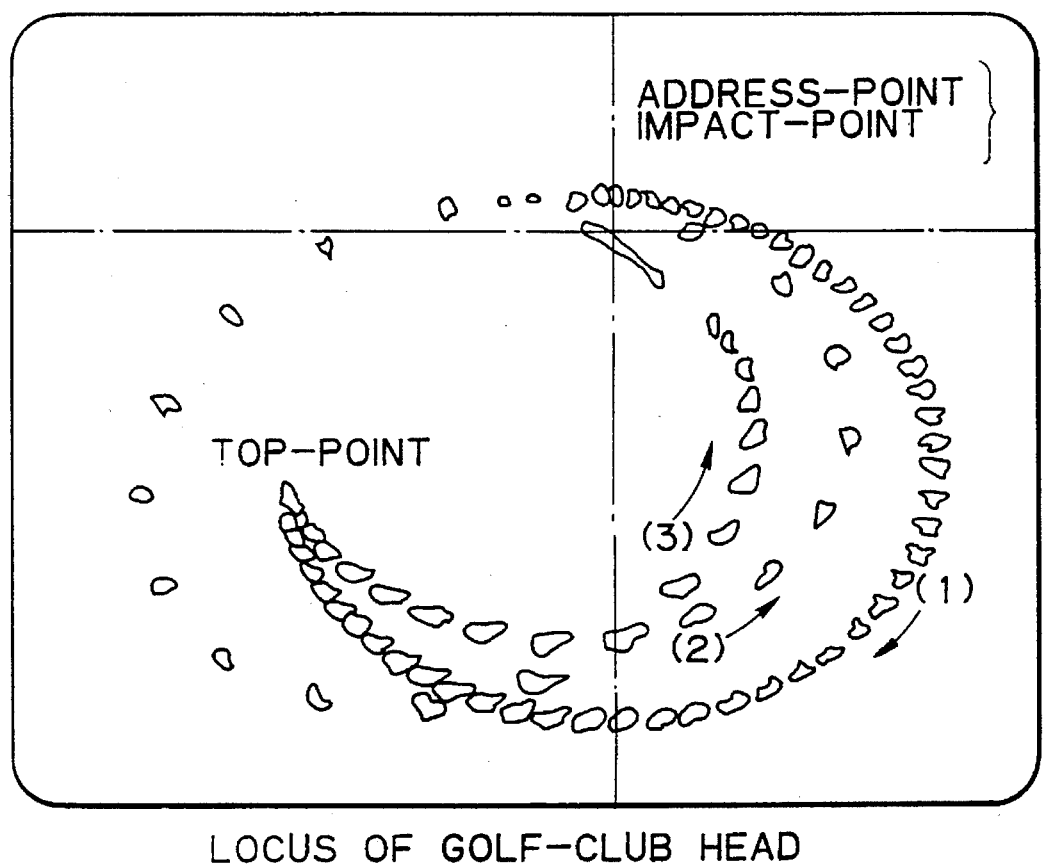
FIG. 8 is a view for explaining a locus of a head of a golf-club displayed on a CRT.

FIG. 8 is a view for explaining a locus of the head of a moving golf-club as displayed on the CRT. This locus is obtained by attaching the color marker 24 to the head of the golf-club. The light source 14 and the color TV camera 16 are provided in front of the object (golfer). This figure is taken at the video rate of the TV signal transmission speed (1/60 second per one frame). In FIG. 8, the arrow line (1) denotes the locus from the "address-point" to the "top-point" of the head of the golf-club, the arrow line (2) denotes the locus from the "top-point" to the "impact-point", and the arrow line (3) denotes the locus after the "impact-point". As is obvious from the drawing, it is possible to clearly analyze the motion of the head of the golf-club by using the color marker according to the present invention.

Figure 9:
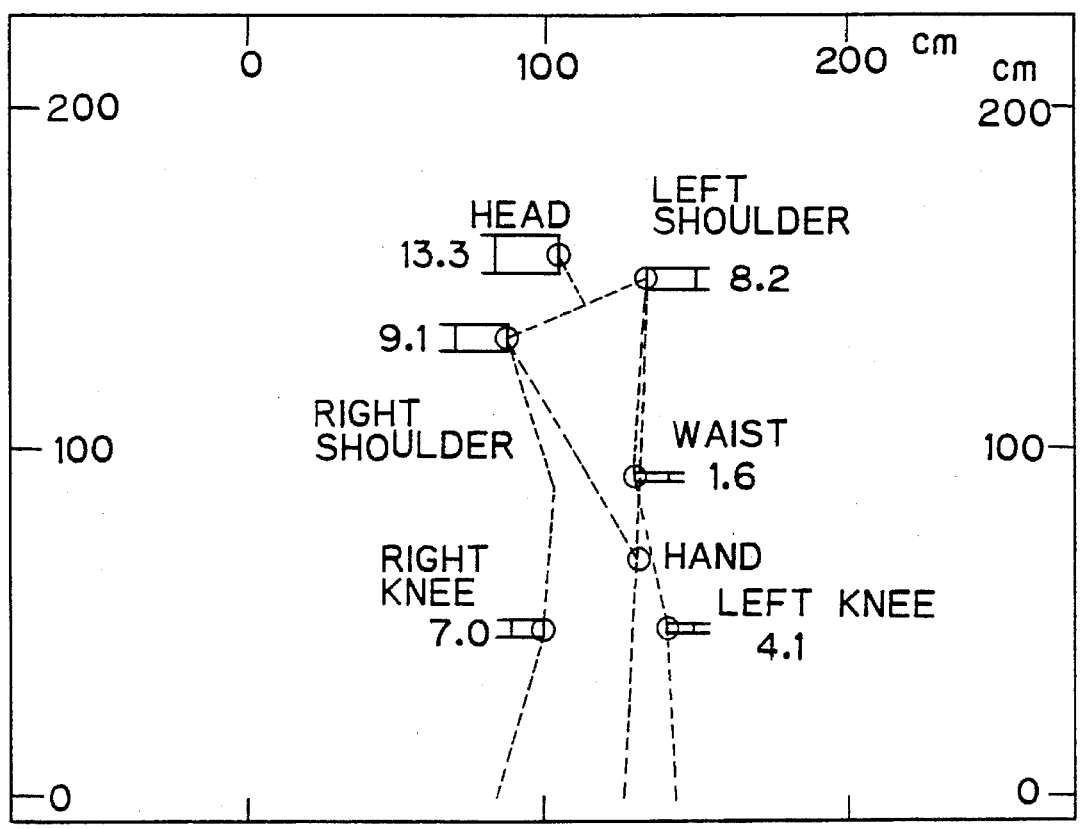
FIG. 9 is a view for explaining vertical fluctuation values at each point of a golfer.

FIG. 9 is a view for explaining vertical fluctuation at each point of the golfer. In this case, a plurality of color markers, each having a different color, are attached to each portion of the object to be analyzed, for example, the head, right shoulder, left shoulder, waist, hand, right knee, and left knee. Each numeral denotes a vertical fluctuation value (cm) from the stationary position, i.e., the "address-point", to the "impact-point". These numbers are calculated based on the locus shown in FIG. 8. For example, "13.3" of the head denotes the vertical fluctuation value from the "address-point" to the "impact-point".

Figure 10:
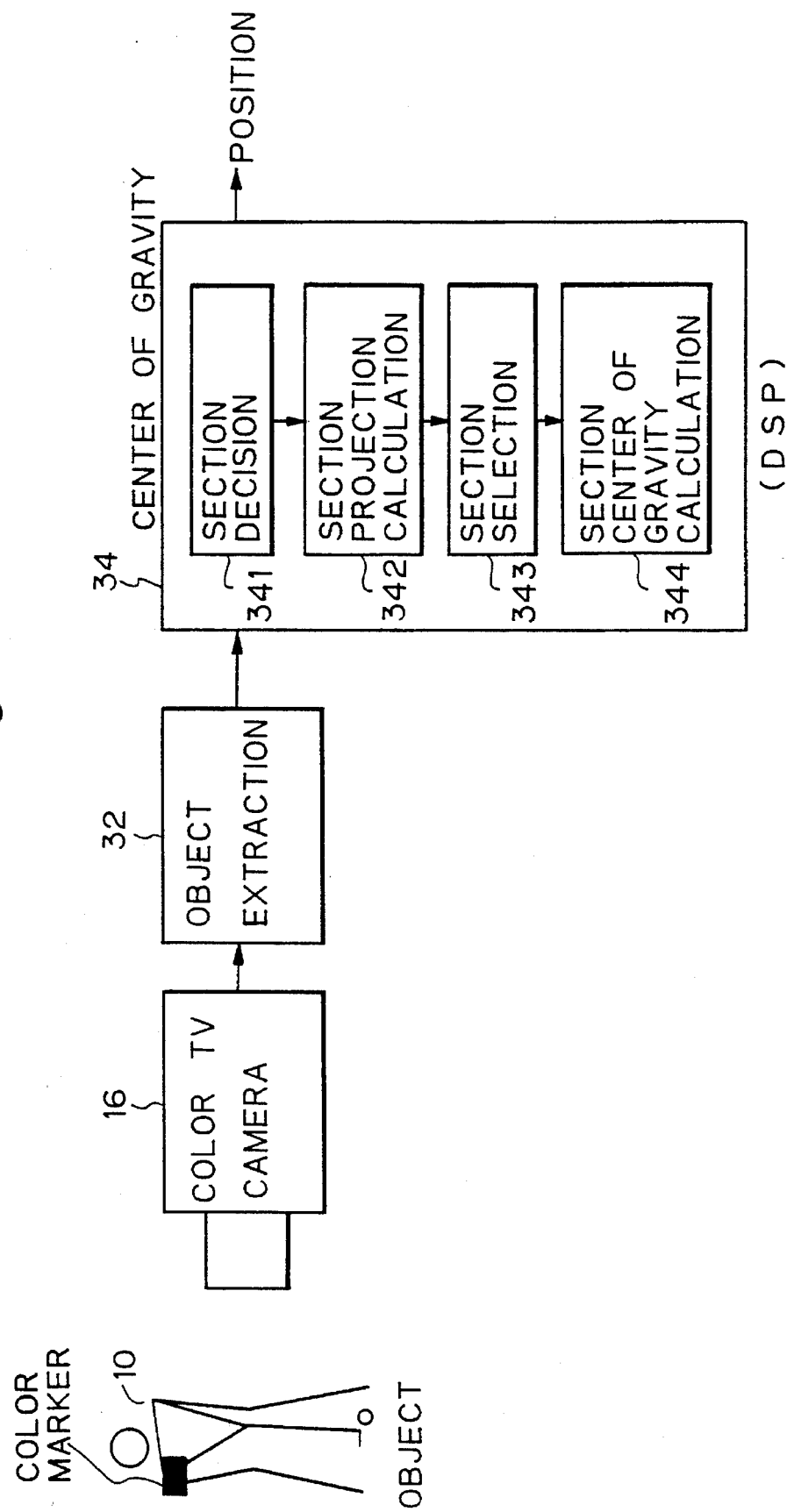
FIG. 10 is a basic block diagram of a motion analysis system according to another embodiment of the present invention.

FIG. 10 is a basic block diagram of a motion analysis system according to another embodiment of the present invention. This embodiment is advantageous for detecting a position of a very small object, for example, a very small color marker based on the calculation of the center of the gravity. As is obvious from the formulae (1) and (2), the center of the gravity is calculated by using all values at one image size. Accordingly, various noises contained in the image affect the calculation of the center of the gravity. In this embodiment, it is possible to eliminate the influence of noise.

In FIG. 10, reference number 32 denotes an object (i.e., color marker) extraction unit for extracting the object from image data. Reference number 34 denotes a center of gravity calculation unit comprising a section decision unit 341, a section projection calculation unit 342, a section selection unit 343, and a section center of gravity calculation unit 344.

The section decision unit 341 decides the section width for calculating the center of gravity in accordance with the size of the object. The section projection calculation unit 342 calculates the projection amount at each section in accordance with the section width defined by the section decision unit 341. The section selection unit 343 selects the maximum section where the projection amount becomes maximum. The section center of gravity calculation unit 344 calculates the center of gravity at the section selected by the section selection unit 343. As an embodiment, the center of gravity calculation unit 34 is constituted by a digital signal processor (DSP). The output of the DSP is input to a host computer (not shown).

FIG. 11 is a view for explaining contents of an external random access memory connected to the digital signal processor according to the present invention. In FIG. 11, the external random access memory (RAM) 36 stores the horizontal projection value Ph (i) and the vertical projection value Pv (j) calculated by the projection calculation circuit 263 shown in FIG. 5. The RAM 36 stores a projection valid section which is defined from the start point to the end point in the movement area of the color marker. The RAM 36 also stores an optional section width, a maximum section projection amount, and the center of gravity. Usually, the section width is defined as twice the size of the color marker 24.

FIG. 12 is a flowchart for calculating the center of gravity in the digital signal processor shown in FIG. 10. In step 1, an accumulation of the projection value at each section is calculated by using the data stored in the external RAM 36, i.e., the horizontal projection value, the vertical projection value, the projection valid section, and the optional section width. In step 2, the projection value at each section calculated in the step 1 is compared with the maximum projection value previously calculated. The maximum projection value is always updated when the projection value exceeds the previous maximum projection value. In step 3, the start point and the end point of the maximum projection value are stored in the section maximum projection area of the external RAM 36.

The above steps 1 to 3 are repeated for all sections so that the section having the maximum projection value and the start/end points at that section can be obtained. The resultant data (i.e., maximum projection value) is stored in the section maximum projection area of the external RAM 36. The steps 4 and 5 are used for calculating the center of gravity having the maximum projection value, and are explained in detail in FIG. 13.

Figure 13:
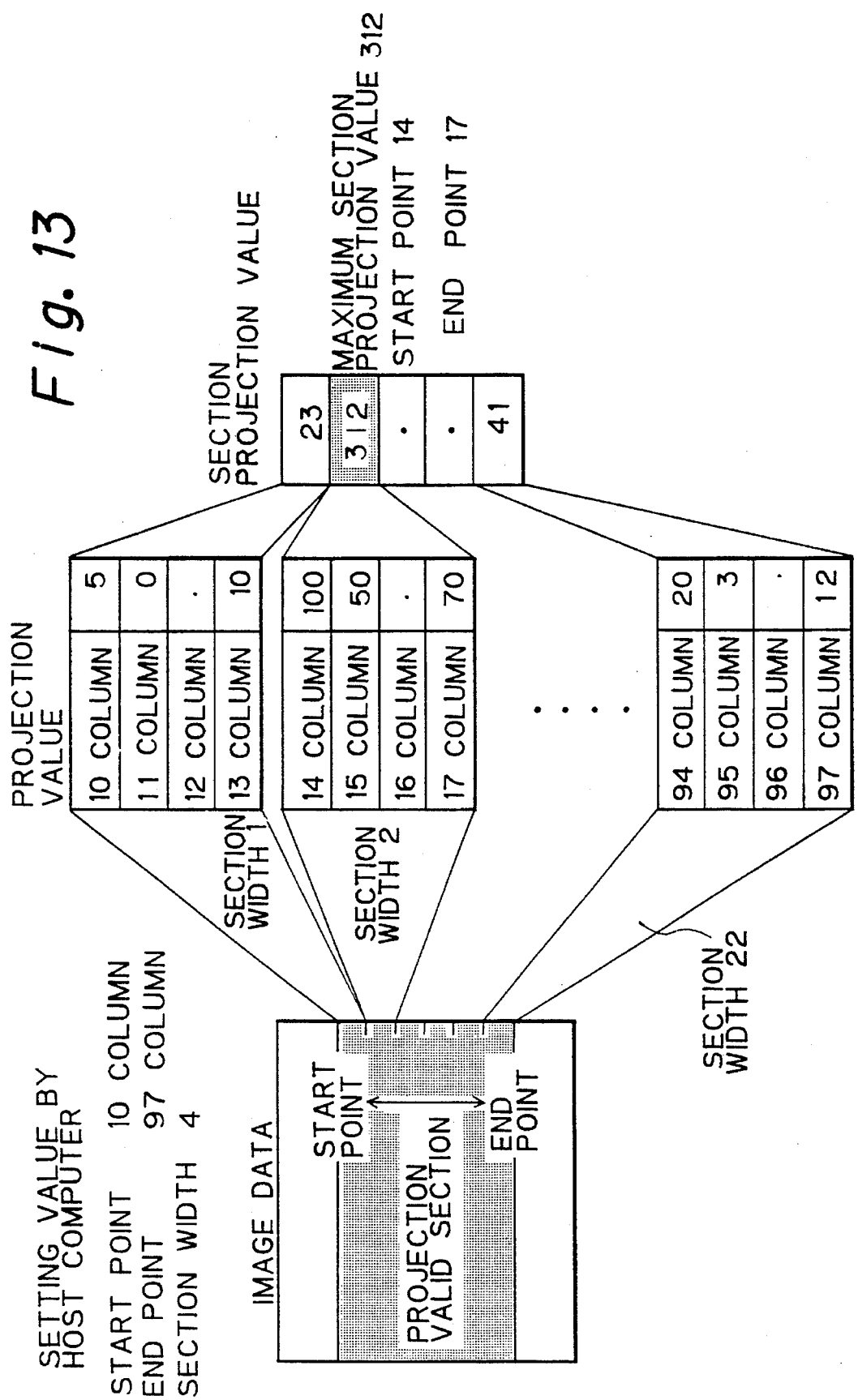
FIG. 13 is a view for explaining processing steps of the maximum section projection value according to the present invention.

FIG. 13 is a view for explaining the processing steps of the maximum section projection value according to the present invention. In FIG. 13, initially, in the host computer, the start point is set to 10 column, the end point is set to 97 column, and the section width is set to 4 in the image data. As shown in the drawing, for example, the projection value at the number 10 column is "5", the projection value at the number 14 column is "100", and the projection value at the number 94 column is "20". In this explanation, "section" is obtained by dividing the color image on the CRT into a plurality of sections.

Further, each projection value at every section width is accumulated. That is, the projection value at the section width 1 is, for example, "23" as accumulated value, the projection value at the section width 2 is, for example, "312" as accumulated value, and the projection value at the section width 22 is, for example, "41" as accumulated value. Accordingly, the maximum section projection value is "312", the start point is the number 14 column, and the end point is the number 17 column. The maximum section projection value, the start point and the end point are stored in the external RAM 36.

As explained in the steps 1 to 3 in FIG. 12, and as is obvious from FIG. 13, the maximum section projection value, and the start/end point thereof are obtained based on the above steps. Next, the center of gravity is calculated for the section having the maximum projection value determined in steps 4 and 5. In step 4, the product of the projection value and the number of column are calculated, and the sum of the product is also calculated. In step 5, the product/sum and the maximum projection value are calculated, and the resultant data is stored in the center of gravity area of the external RAM.

Where, in the horizontal projection, the start point having the maximum projection value is "sth", and the end point having the maximum projection value is "edh". In the vertical projection, the start point having the maximum projection value is "stv" and the end point having the maximum projection value is "edv". The center of gravity in the section having the maximum projection value is given as follows.

$$X\text{center} = \left( \sum_{j=stv}^{edv} (Pv(j)*j) \right) / SUM$$

$$Y\text{center} = \left( \sum_{i=sth}^{edh} (Pv(i)*i) \right) / SUM$$

These formulae are the same as the formulae (2).

Figure 15:
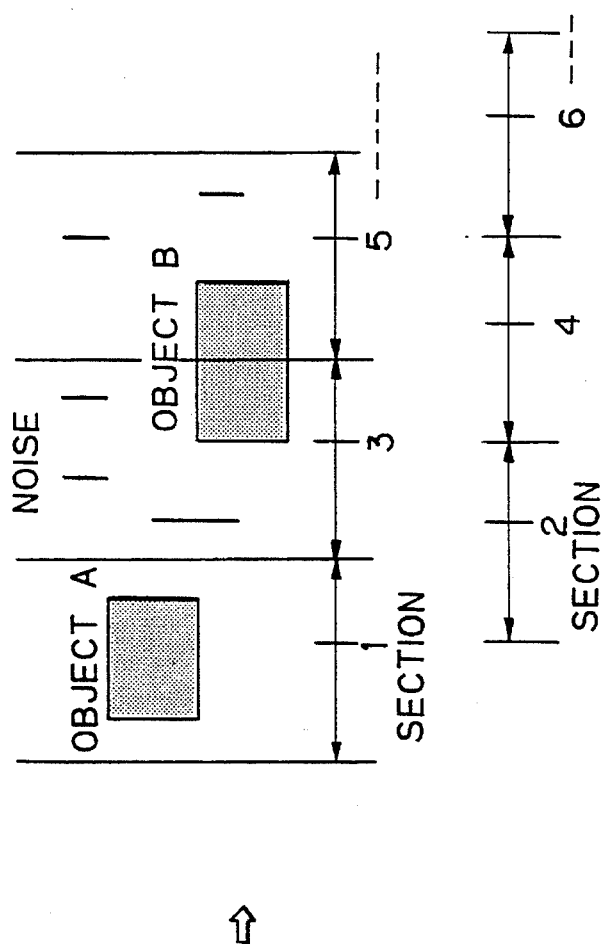
FIG. 15 is a view for explaining the section setting for the calculation of the center of gravity according to one example of the present invention.
Figure 14:
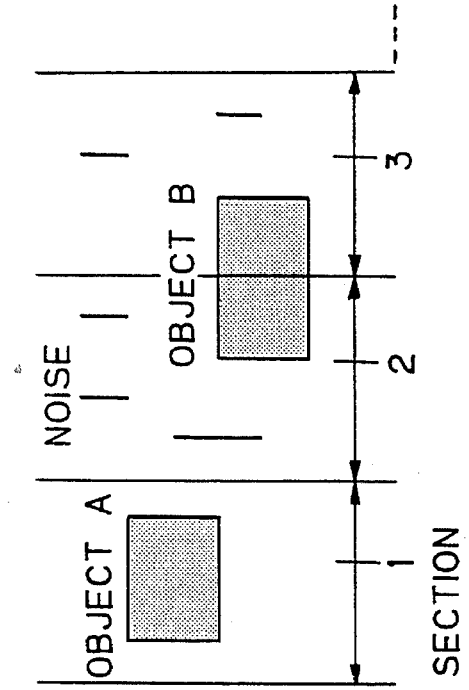
FIG. 14 is a view for explaining the section setting for the calculation of the center of gravity.
Figure 16:
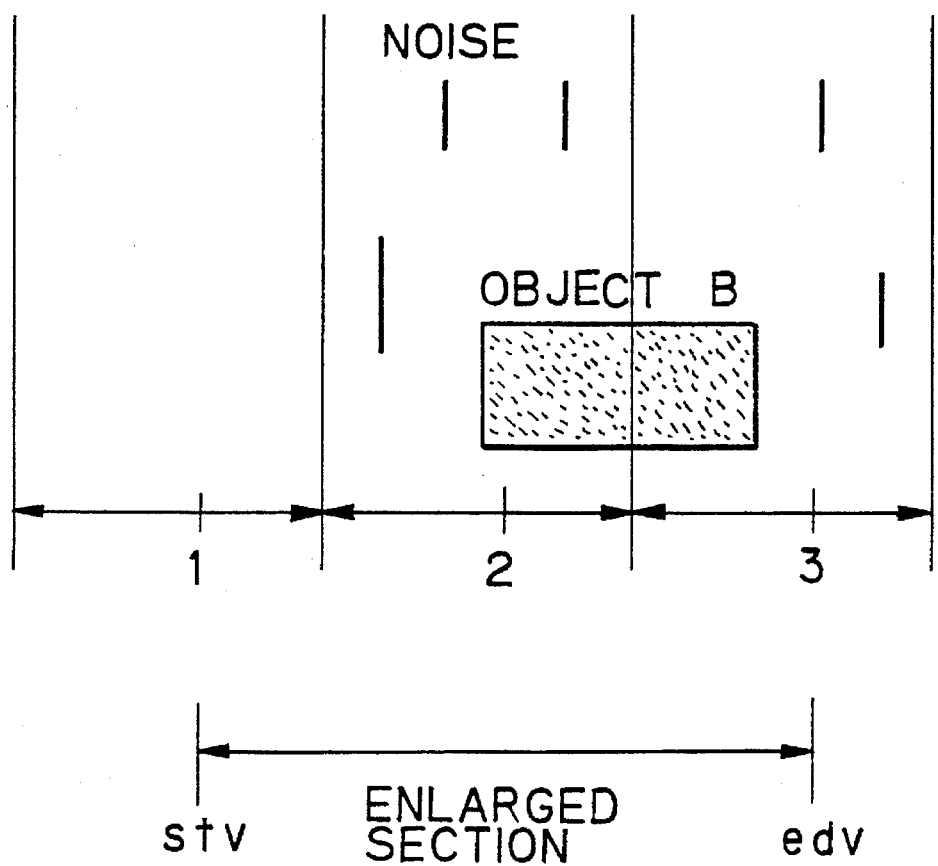
FIG. 16 is a view for explaining the section setting for the calculation of the center of gravity 10 according to another example of the present invention.

FIG. 14 is a view for explaining the section setting for the calculation of the center of gravity, FIG. 15 is a view for explaining the section setting for the calculation of the center of gravity according to one example of the present invention, and FIG. 16 is a view for explaining the section setting for the calculation of the center of gravity according to another example of the present invention.

In FIG. 14, sections 1, 2, 3, - - - are defined. The object (color marker) A is completely included in only the section 1, but the object B is included in the sections 2 and 3. In the case of the object A, it is possible to precisely calculate the center of gravity because the object A is completely included in the section 1. However, in the case of the object B, when the center of gravity is calculated only in the section 2 or the section 3, an error in the center of gravity becomes large because the object B is included in both sections 2 and 3.

In one example of the present invention, as shown in FIG. 15, two kinds of the sections are provided for the objects A and B. In this case, sections 2, 4, 6 - - - a are shifted in relation to the sections 1, 3, 5 - - - so as to include the object B. Accordingly, the object A is perfectly included in the section 1, and the object B is perfectly included in the section 4. Therefore, since the center of gravity of the object A is calculated in the section 1 and the center of gravity of the object B is calculated in the section 4, it is possible to precisely calculate the centers of gravity of both objects A and B.

Further, in another example of the present invention, as shown in FIG. 16, the section width is enlarged so as to completely include the object B. The merit of this example is the fact that it is possible to simplify the structure of the DSP since the number of registers (not shown) can be reduced.

We claim:

1. A motion analysis system comprising:
   at least one color marker attached to an object to be analyzed, the at least one color marker having a high directivity reflective member on a surface of the at least one color marker, and the high directivity reflective member reflecting light of a particular color;
   a light source for generating light to be irradiated onto at least one color marker;
   a stationary color TV camera aligned in approximately the same direction as the light source, for receiving light of the particular color reflected from the at least one color marker and outputting a color image;
   a color extraction means operatively coupled to the stationary color TV camera, for extracting the particular color from the color image produced by the stationary color TV camera;
   area calculation means operatively coupled to the color extraction means, for calculating an area of the particular color extracted by the color extraction means;
   diaphragm adjustment means operatively coupled between the stationary color TV camera and the area calculation means, for adjusting a diaphragm of the stationary color TV camera so as to adjust an amount of light of the particular color reflected from the at least one color marker entering the stationary color TV camera so that the area calculated by the area calculation means coincides with an actual color area of the at least one color marker; and
   center of gravity calculation means operatively coupled to the area calculation means, for calculating a position of a center of gravity of the particular color based on the area calculated by the area calculation means.

2. A motion analysis system as claimed in claim 1, wherein said at least one color marker is formed as a spherical body having the high directivity reflective member attached on the surface of said at least one color marker.

3. A motion analysis system as claimed in claim 1, wherein said at least one color marker is formed by a polygonal body having the high directivity reflective member attached on the surface of said at least one color marker.

4. A motion analysis system as claimed in claim 1, wherein said color extraction means comprises a look-up table for a data conversion from an R, G, B signal to a particular color bit, the R, G, B signal being input from the stationary color TV camera through an analog-to-digital converter.

5. A motion analysis system as claimed in claim 4, wherein said look-up table outputs a bit "1" when the particular color indicating a color of the color marker is detected, and outputs a bit "0" when another color is detected.

6. A motion analysis system as claimed in claim 1, wherein said area calculation means comprises a particular color extraction circuit, and a projection amount calculation circuit for calculating the area of the particular color obtained by adding values of pixels for each row and column of the color image.

7. A motion analysis system as claimed in claim 1, wherein said center of gravity calculation means comprises:
   a digital signal processor associated with a host computer, the digital signal processor having section decision means for determining a section width for a calculation of the center of gravity in accordance with a size of the object, section projection calculation means for calculating a projection amount in a section by adding values of pixels for each row and column of the section, section selection means for selecting the section corresponding to a maximum projection amount, and section center of gravity calculation means for calculating the center of the gravity at a selected section.

8. A motion analysis system as claimed in claim 7, wherein said digital signal processor further comprises an external random access memory (RAM), the external RAM storing a horizontal projection value, a vertical projection value, a projection valid section, a section width, a maximum section projection, and a position of the center of gravity.

9. A motion analysis system as claimed in claim 1, wherein the at least one color marker includes two or more color markers having mutually different respective colors with respective predetermined wavelength ranges.

10. A method for adjusting a diaphragm of a color TV camera and for determining an effective image center of an object represented by object data associated with a color marker, included within a plurality of image data, comprising the steps of:
   a) dividing the plurality of image data into a plurality of columns of image data and a plurality of rows of image data;
   b) calculating an amount of object data included within each of the plurality of columns of image data and each of the plurality of rows of image data by adding values of the image data, to provide a plurality of respective vertical projection values and a plurality of respective horizontal projection values;

c) dividing the plurality of vertical projection values and the plurality of horizontal projection values into a plurality of sections;

d) summing the plurality of vertical projection values and the plurality of horizontal projection values for each of the plurality of sections to provide a plurality of respective section projection values;

e) determining a maximum of the plurality of respective section projection values;

f) selecting one of the plurality of sections as a selected section, based on the maximum;

g) determining a sum of the object data by adding the values of the image data for all rows and columns;

h) comparing the sum with a predetermined object area; and i) adjusting the diaphragm of the color TV camera, based on said step (h).

11. A method as claimed in claim 10, further comprising the steps of:

g) multiplying the plurality of vertical projection values by respective ones of a plurality of columns numbers to provide a plurality of respective weighted vertical projection values for the selected section;

h) multiplying the plurality of horizontal projection values by respective ones of a plurality of row numbers to provide a plurality of respective weighted horizontal projection values for the selected section; and i) dividing the plurality of respective weighted horizontal projection values and the plurality of respective weighted vertical projection values by the amount of object data to provide a Y center and an X center, respectively.

12. A method as claimed in claim 10, further comprising the steps of:

j) adjusting a size of the plurality of sections so that image data corresponding to the object is entirely included within one of the plurality of sections.

13. A method as claimed in claim 10, further comprising the steps of:

j) dividing the plurality of sections into a first plurality of sections and a second plurality of sections, and repeating said steps (d) through (f) for each of the first and second plurality of sections.

14. A method for generating data corresponding to an object subject to movement, comprising the steps of:

a) attaching a marker capable of producing a reflected light of a predetermined wavelength range, to an object;

b) irradiating the object with a light;

c) receiving a light image including the object and the reflected light from the marker with a stationary light receiver;

d) converting the light image into an electronic signal including data;

e) extracting data corresponding to the predetermined wavelength range from the electronic signal;

f) calculating an area of the predetermined wavelength range based on the data corresponding to the predetermined wavelength range;

g) comparing the area of the predetermined wavelength range with a predetermined area to provide a result; and h) adjusting a diaphragm of the stationary light receiver based on the result so as to adjust an amount of light in the light image entering the stationary light receiver.

15. A method as claimed in claim 14, wherein said steps (c)–(h) are repeatedly executed.

16. A method as claimed in claim 14, further comprising the steps of:

(i) generating a display based on the data.

17. A method as recited in claim 16, wherein said steps (c)–(i) are repeatedly executed.

18. A motion analysis system comprising:

at least one color marker attached to an object to be analyzed, the at least one color marker having a high directivity reflective member on a surface of the at least one color marker, and the high directivity reflective member reflecting light of a particular color;

a light source for generating light to be irradiated onto at least one color marker;

a stationary color TV camera aligned in approximately the same direction as the light source, for receiving light of the particular color reflected from the at least one color marker and outputting a color image;

a color extraction means operatively coupled to the stationary color TV camera, for extracting the particular color from the color image produced by the stationary color TV camera;

area calculation means operatively coupled to the color extraction means, for calculating an area of the particular color extracted by the color extraction means;

diaphragm adjustment means operatively coupled between the stationary color TV camera and the area calculation means, for adjusting a diaphragm of the stationary color TV camera so as to adjust an amount of light of the particular color reflected from the at least one color marker entering the stationary color TV camera so that the area calculated by the area calculation means coincides with an actual color area of the at least one color marker;

center of gravity calculation means operatively coupled to the area calculation means, for calculating a position of a center of gravity of the particular color based on the area calculated by the area calculation means;

said center of gravity calculation means comprising a digital signal processor associated with a host computer, the digital signal processor having section decision means for determining a section width for a calculation of the center of gravity in accordance with a size of the object, section projection calculation means for calculating a projection amount in a section by adding values of pixels for each row and column of the section, section selection means for selecting the section corresponding to a maximum projection amount, and section center of gravity calculation means for calculating the center of the gravity at a selected station; and said section selection means providing two kinds of sections, and selecting one of the two kinds of the sections so as to include the object within one section.

19. A motion analysis system comprising:

at least one color marker attached to an object to be analyzed, the at least one color marker having a high directivity reflective member on a surface of the at least one color marker, and the high directivity reflective member reflecting light of a particular color;

a light source for generating light to be irradiated onto at least one color marker;

a stationary color TV camera aligned in approximately the same direction as the light source, for receiving light of the particular color reflected from the at least one color marker and outputting a color image;

a color extraction means operatively coupled to the stationary color TV camera, for extracting the particular color from the color image produced by the stationary color TV camera;

area calculation means operatively coupled to the color extraction means, for calculating an area of the particular color extracted by the color extraction means;

diaphragm adjustment means operatively coupled between the stationary color TV camera and the area calculation means, for adjusting a diaphragm of the stationary color TV camera so as to adjust an amount of light of the particular color reflected from the at least one color marker entering the stationary color TV camera so that the area calculated by the area calculation means coincides with an actual color area of the at least one color marker;

center of gravity calculation means operatively coupled to the area calculation means, for calculating a position of a center of gravity of the particular color based on the area calculated by the area calculation means;

said center of gravity calculation means comprising a digital signal processor associated with a host computer, the digital signal processor having section decision means for determining a section width for a calculation of the center of gravity in accordance with a size of the object, section projection calculation means for calculating a projection amount in a section by adding values of pixels for each row and column of the section, section selection means for selecting the section corresponding to a maximum projection amount, and section center of gravity calculation means for calculating the center of the gravity at a selected station; and said section selection means enlarging a section width so as to completely include the object within one section when the object is found to be included in two sections.

* * * * *

UNITED STATES PATENT AND TRADEMARK OFFICE
CERTIFICATE OF CORRECTION

PATENT NO. : 5,459,793
DATED : October 17, 1995
INVENTOR(S) : Satoshi NAOI et al.

It is certified that error appears in the above-indentified patent and that said Letters Patent is hereby corrected as shown below:

Column 2, line 59, delete "10".

Column 4, line 9, change "units" to

--unit--;

line 50, after "provided" insert

--for--;

line 51, delete "on".

Column 8, line 50, change "column" to

--columns--;

Column 9, line 26, delete "a".

Signed and Sealed this

Twenty-third Day of April, 1996

Attest:

BRUCE LEHMAN

*Attesting Officer*     *Commissioner of Patents and Trademarks*